United States Patent
Vembu et al.

(10) Patent No.: US 10,990,749 B2
(45) Date of Patent: Apr. 27, 2021

(54) MESSAGING APPLICATION WITH PRESENTATION SERVICE

(71) Applicant: Zoho Corporation Private Limited, Kanchipuram District (IN)

(72) Inventors: Sridhar Vembu, Pleasanton, CA (US); Arthur J. Behiel, Pleasanton, CA (US); Sudheer A. Grandhi, Pleasanton, CA (US)

(73) Assignee: Zoho Corporation Private Limited, Kanchipuram District (IN)

( * ) Notice: Subject to any disclaimer, the term of this patent is extended or adjusted under 35 U.S.C. 154(b) by 0 days.

(21) Appl. No.: 16/898,738

(22) Filed: Jun. 11, 2020

(65) Prior Publication Data

US 2020/0302107 A1    Sep. 24, 2020

Related U.S. Application Data

(63) Continuation of application No. 15/973,408, filed on May 7, 2018, now Pat. No. 10,685,169.
(Continued)

(51) Int. Cl.
*G06F 17/00* (2019.01)
*G06F 40/103* (2020.01)
(Continued)

(52) U.S. Cl.
CPC .......... *G06F 40/103* (2020.01); *G06F 3/0482* (2013.01); *G06Q 10/10* (2013.01);
(Continued)

(58) Field of Classification Search
None
See application file for complete search history.

(56) References Cited

U.S. PATENT DOCUMENTS 7,479,949 B2    1/2009  Jobs et al.
7,610,287 B1 *  10/2009 Dean ................... H04L 12/1818
(Continued)

FOREIGN PATENT DOCUMENTS

WO    2012125815 A2    9/2012

OTHER PUBLICATIONS

"Skype for Business User Guide", university of south Australia, total pp. 18, dated May 26, 2015, URL:<http://w3.unisa.edu.au/ists/new/staff/phones-conferencing/UniSA-Skype-for-Business-User-Guide.pdf> (Year: 2015).*
(Continued)

*Primary Examiner* — Mustafa A Amin
(74) *Attorney, Agent, or Firm* — Arthur Behiel; Mark Lauer; Silicon Edge Law Group LLP

(57) ABSTRACT

A messaging system supports a presentation session with participants of the presentation, a presenter and one or more audience members. The messaging system allows the participants to share messages and documents via respective client/mobile devices. An application on each mobile device allows the audience member to peruse and comment on document portions (e.g., pages, images, or slides) being presented. The presentation sequence for the document portions can be managed by the presenter, or document perusal can be decoupled from the presentation sequence to allow audience members to focus on past or future document portions. Comments of the audience member or other participants can be linked to corresponding document portions.

17 Claims, 14 Drawing Sheets

Related U.S. Application Data

(60) Provisional application No. 62/502,852, filed on May 8, 2017.

(51) Int. Cl.

| | |
|---|---|
| *G06F 3/0482* | (2013.01) |
| *H04L 12/58* | (2006.01) |
| *G06Q 10/10* | (2012.01) |
| G06Q 50/00 | (2012.01) |
| H04L 12/18 | (2006.01) |

(52) U.S. Cl.
CPC ........... *G06Q 10/107* (2013.01); *H04L 51/10* (2013.01); *G06Q 50/01* (2013.01); *H04L 12/1822* (2013.01)

(56) References Cited

U.S. PATENT DOCUMENTS

| | | | |
|---|---|---|---|
| 7,680,895 | B2 | 3/2010 | Perlow et al. |
| 8,041,770 | B1 | 10/2011 | Schmidt |
| 8,232,990 | B2 | 7/2012 | King et al. |
| 8,514,221 | B2 | 8/2013 | King et al. |
| 8,645,872 | B2 | 2/2014 | Maxfield et al. |
| 8,766,928 | B2 | 7/2014 | Weeldreyer et al. |
| 8,775,520 | B1* | 7/2014 | Lewis ................ H04L 51/066 709/206 |
| 2002/0010743 | A1 | 1/2002 | Ryan et al. |
| 2002/0085030 | A1* | 7/2002 | Ghani ...................... G09B 7/00 715/751 |
| 2004/0266412 | A1* | 12/2004 | Maes ...................... G06Q 10/10 455/414.4 |
| 2005/0015451 | A1 | 1/2005 | Sheldon et al. |
| 2006/0026535 | A1 | 2/2006 | Hotelling et al. |
| 2006/0041848 | A1* | 2/2006 | Lira ...................... G06Q 10/107 715/805 |
| 2006/0137007 | A1 | 6/2006 | Paatero et al. |
| 2006/0195781 | A1 | 8/2006 | Jatavallabha et al. |
| 2006/0236246 | A1* | 10/2006 | Bono ...................... G09B 5/00 715/730 |
| 2007/0208806 | A1* | 9/2007 | Mordecai ............... G06Q 10/10 709/204 |
| 2008/0133675 | A1* | 6/2008 | Ramanathan ........... H04L 51/04 709/206 |
| 2008/0272907 | A1* | 11/2008 | Bonansea ......... H04M 1/72519 340/539.11 |
| 2009/0249222 | A1* | 10/2009 | Schmidt ................ H04L 51/32 715/751 |
| 2009/0307315 | A1 | 12/2009 | Murphy, Jr. et al. |
| 2010/0131835 | A1 | 5/2010 | Kumar et al. |
| 2010/0161540 | A1 | 6/2010 | Anisimov et al. |
| 2010/0162093 | A1* | 6/2010 | Cierniak ............... G06F 40/134 715/205 |
| 2011/0113011 | A1* | 5/2011 | Prorock ................ G11B 27/36 707/634 |
| 2011/0264705 | A1 | 10/2011 | Diamond |
| 2012/0089950 | A1 | 4/2012 | Tseng |
| 2012/0266159 | A1 | 10/2012 | Risbood et al. |
| 2013/0227420 | A1 | 8/2013 | Pasquero et al. |
| 2014/0173423 | A1 | 6/2014 | Meisels et al. |
| 2014/0173530 | A1 | 6/2014 | Mesguich Havilio et al. |
| 2014/0196022 | A1 | 6/2014 | Skutin et al. |
| 2014/0362165 | A1* | 12/2014 | Ackerman .......... H04L 65/4076 348/14.07 |
| 2015/0120840 | A1* | 4/2015 | Rostocil, Jr. ............ H04L 51/04 709/206 |
| 2015/0169069 | A1* | 6/2015 | Lo ............................ G06F 3/011 715/753 |
| 2015/0350029 | A1* | 12/2015 | Skrobotov .............. H04L 41/22 715/740 |
| 2015/0370772 | A1* | 12/2015 | Wang .................... G06F 40/169 715/230 |
| 2016/0085397 | A1* | 3/2016 | Jain ........................ G06F 1/163 715/828 |
| 2016/0205049 | A1* | 7/2016 | Kim ...................... G06F 3/0488 455/414.1 |
| 2016/0234135 | A1* | 8/2016 | Kim ........................ H04L 51/04 |
| 2016/0291921 | A1* | 10/2016 | Miller ................ H04N 21/4307 |
| 2016/0337291 | A1* | 11/2016 | Park ........................ H04L 51/32 |
| 2017/0185254 | A1* | 6/2017 | Zeng .................... H04L 65/4015 |
| 2017/0185268 | A1* | 6/2017 | Zeng .................... G06F 3/04845 |
| 2017/0270113 | A1* | 9/2017 | Ebeling ................ G06F 40/106 |
| 2017/0295117 | A1* | 10/2017 | Pfriem ................ G06Q 10/107 |
| 2017/0366493 | A1* | 12/2017 | Wilde .................. G06Q 10/101 |
| 2018/0300309 | A1* | 10/2018 | Denoue ................ G06F 40/131 |

OTHER PUBLICATIONS

"Skype for Business, Quick Start Guide", Microsoft Corporation, total pp. 12, dated Apr. 10, 2015, URL:<https://www.udmercy.edu/about/its/help/files/skype-for-business.pdf> (Year: 2015).*

"Using Skype for making Voice Calls and Sharing Document", NPL, pp. 1-7, dated: 2015, URL:<https://www.intel.com/content/dam/www/program/education/us/en/documents/intel-easy-steps/easy-steps-use-skype-share-documents.pdf> (Year: 2015).*

Wroblewski, Touch Gesture Reference Guide, Apr. 4, 2010, web page printout, 6 pages.

Olark, Everything You Need to Make Customers Happy, Aug. 6, 2014, web page printout, 5 pages.

Olark, Targeted Chat, Aug. 6, 2014, web page printout, 2 pages.

Various contributors, Real user monitoring, (Wikipedia, Creative Commons), Sep. 9, 2014, 2 pages.

Google Support, Urchin Tracking Module (UTM), Sep. 17, 2015, web page printout, 7 pages.

AppsBuilder SpA, The All-in-One Tool, Nov. 15, 2015, web page printout, 11 pages.

SmartBear Software, Inc., AlertSite UXM What is Real-User Monitoring?, Sep. 9, 2014, web page printout, 4 pages.

Live Chat, for Customers—Chat Always available for your clients, Aug. 6, 2014, web page printout, 21 pages.

Zopim, Zopim Live Chat Features—Build Meaningful relationships, right on your website, Aug. 6, 2014, web site printout, 5 pages.

Cholling, Charles C. et al., Natural language programming, (Wikipedia, Creative Commons), Nov. 24, 2014, 4 pages.

Viticci, Federico, Our Favorite Markdown Writing App for the iPhone, The Sweet Setup (Blanc Media, LLC), Feb. 4, 2015, web page printout, 10 pages.

ClickDesk, Live Chat, Video & VOIP, Helpdesk in one system, Aug. 6, 2014, web page printout, 12 pages.

Guay, Matthew, Editorially—A Brilliant Markdown Collaborate Writing and Editing App, Jul. 19, 2013, web page printout, 7 pages.

* cited by examiner

MESSAGING APPLICATION WITH PRESENTATION SERVICE

FIELD OF THE INVENTION

The embodiments disclosed herein relate to methods and apparatus for supporting presentation services in messaging applications (e.g. chat applications, text-messaging applications, message-stream applications, forum applications, blogging applications, email applications) for documents (e.g. from a document application).

BACKGROUND

Messaging applications may be hosted on a server on the network (e.g. a cloud-based system) and a user interface may be provided via a browser or a client application on a client device such as a laptop computer or mobile device. Such messaging applications support sending and receiving messages between or amongst users in an asynchronous manner where messages (e.g. text, voice, image, audio, video, or any multimedia content) may be sent or received at any time (i.e. asynchronously with respect to other messages and other users).

Document applications include document management services (e.g. document creation, editing and maintenance) and also document presentation services (e.g. document presentation such as a slide presentation or multimedia document presentation).

Existing messaging applications do not support presentation services for documents (e.g. from document applications) in a seamless and efficient manner. There is a need for a presentation service that would enable a user of a messaging application to present a document, for example a multimedia document, to other users of the messaging application.

BRIEF DESCRIPTION OF THE DRAWINGS

FIG. 7B shows a graphical user interface 741 for a messaging application like that of FIG. 6A but from the perspective of an audience member, with like-identified elements being the same or similar.

The figures are illustrations by way of example, and not by way of limitation. Like reference numerals in the figures refer to similar elements.

DETAILED DESCRIPTION

Figure 1:
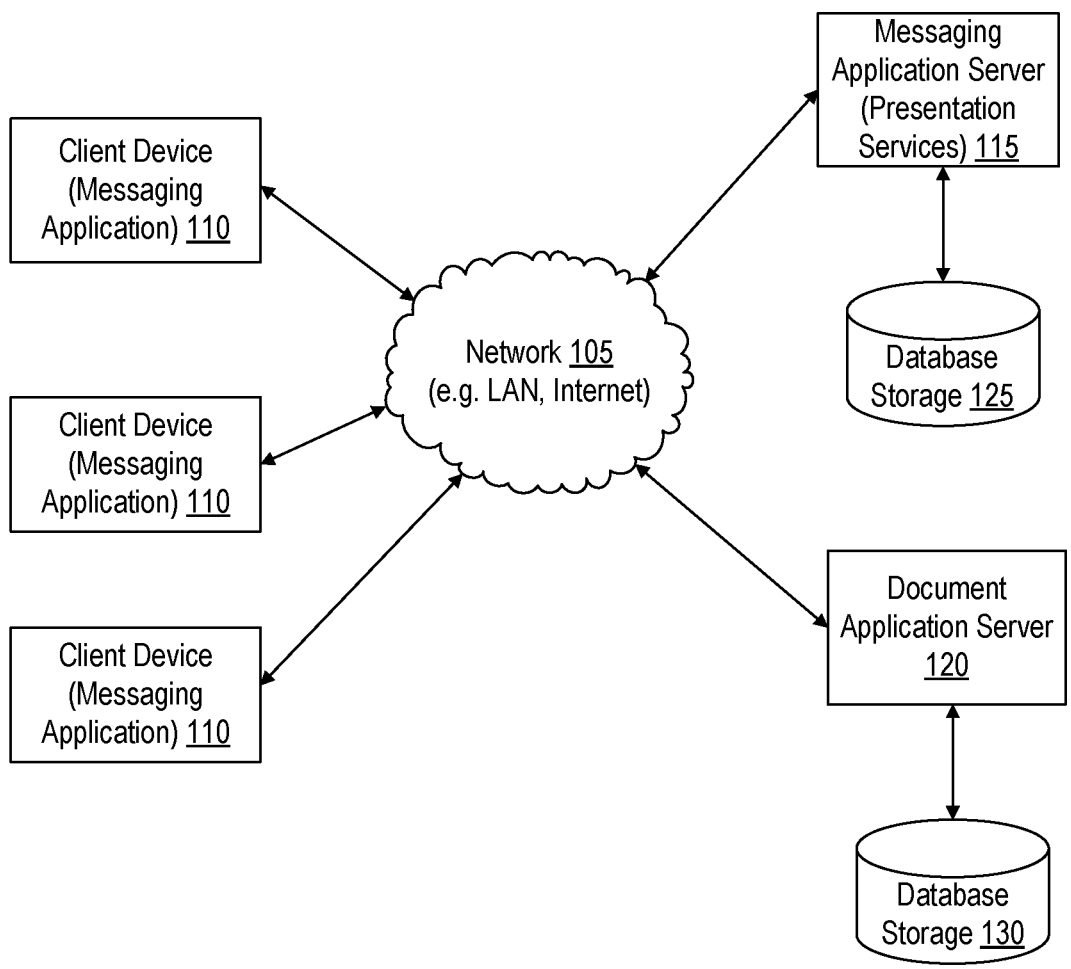
FIG. 1 shows a network system 100 that supports a messaging application with which a presenter can share a presentation with one or more audience members.

In FIG. 1 an example network system 100 is shown depicting components relevant to the embodiments described herein. Network system 100 includes a network 105 that allows communication among various computing and communication devices, client devices 110, a messaging application server 115, and a document application server 120 in this example. The communication between various components on the network may be via wired or wireless technologies. The network may also enable cloud services where computing resources are shared and configured in various combinations to provide efficiencies and benefits in the areas of operational cost and scaling. For example, a document application may be hosted or provided as cloud services via one or more Application Servers. Also, a messaging application may be provided as cloud services via one or more Application Servers.

An application (e.g. document application, messaging application) hosted on one or more application servers may also utilize database storage for storing data related to the application and its associated services. In the example of FIG. 1, messaging application server 115 has access to database storage 125. Services of the application may be accessed by users via computing and communication devices referred to as client devices (e.g. Smartphones, Tablets, Laptops). Application services provided by an application hosted on one or more application servers may be accessed by a user via a client application (or a module designed specifically for that purpose) executing on a client device (e.g. Smartphone, Tablet, Laptop). In some scenarios Application services (and corresponding user interfaces) hosted on one or more application servers on the network may be accessed by a user via a dedicated messaging application or a web browser running on a client device. In the example of FIG. 1, document application server 120 has access to database storage 130, which may be on the same or different hardware as database storage 125.

FIG. 1 shows one possible configuration of a network system. A typical network system may have various other configurations and components. As shown in FIG. 1 a messaging application executing on application server 115 on the network or cloud system may generate one or more user interfaces to allow a user to engage in communication with other users. These user interfaces may be accessed by a user via one of client devices 110. A user interface provided by an application (e.g. messaging application or document application) creates an interactive experience for the user and may be rendered for an input and output system (e.g. touchscreen display) on the client device. Even though the description herein frequently presents an Application or Software Application (e.g. messaging application or document application) as being supported on a single server, all possible configurations for implementation involving one or more servers (including the corresponding software code or modules) are within the scope of the embodiments described herein.

The mechanisms supporting Presentation services in messaging applications for documents (e.g. from document applications) as described herein may be provided using software or program modules executing on server and client computer devices. Software or program modules may also be used to provide the various features described herein for document applications and messaging applications.

Various configurations are possible in implementing Presentation services in messaging applications (e.g. chat applications, message stream applications) for documents (e.g. from a document application) as described herein. The software or program modules for supporting Presentation services in messaging applications may be part of messaging applications, plug-ins or add-ons to messaging applications or separate applications with APIs to interface or communicate with messaging applications, in order to implement the features and embodiments described herein.

Figure 2:
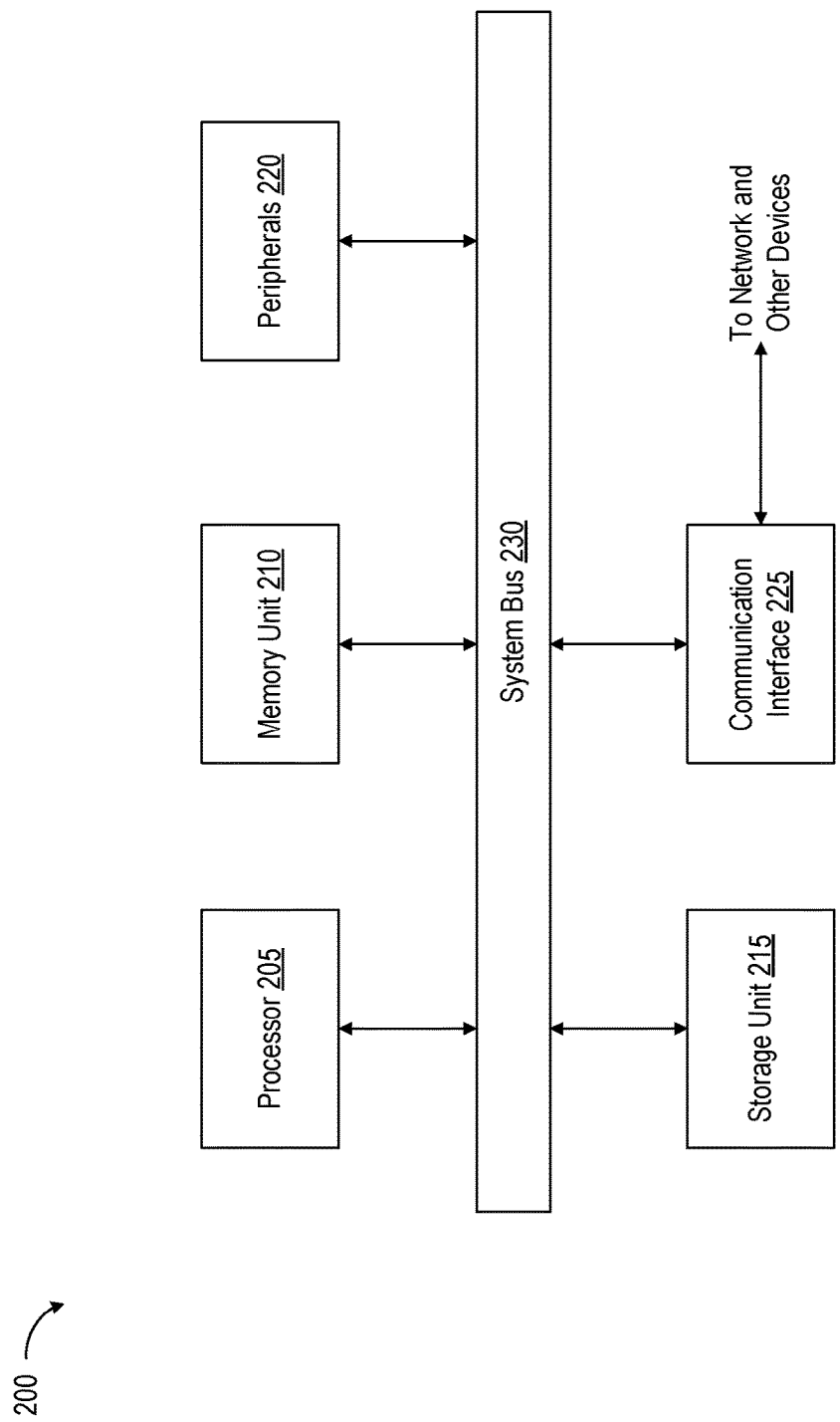
FIG. 2 (prior art) illustrates an exemplary computer system 200 which may be employed in implementing the features and embodiments described herein.

FIG. 2 (prior art) illustrates an exemplary computer system 200 which may be employed in implementing the features and embodiments described herein. The components of the computer system can include one or more processors 205, memory units 210, storage units 215, peripherals 220, and communication interfaces 225 which are connected to a system bus 230 or other communication medium. The processor may be a processing engine such as for example a microprocessor. The memory unit may include RAM (random access memory) and ROM (read only memory) for storing information, instructions and program modules for execution by the processor. The storage unit which may be fixed or removable may include any of several types of storage media (e.g. hard disk, optical disk drive, flash) and may be used to store program modules and data. The program modules stored in the memory unit or storage unit may include for example an operating system, application programs, and other program modules such as a communication module. Peripherals may include input and output systems or devices such as, for example keyboard, mouse, microphone, touch screen display. Communication interfaces can be used to connect/communicate with other devices over various types of networks (e.g. wired and wireless) and may include for example a modem, Ethernet or NIC (Network Interface Controller) card. Depending on the configuration, components and computer program modules (which provide the control logic for the processor to perform functions) included in the computer system illustrated in FIG. 2 may be used as a server or client computer device. Those skilled in the art will recognize that other computer systems or architectures may also be used to implement the embodiments described herein.

It should be appreciated that even though the description herein frequently assumes that the features and embodiments of a presentation service for a messaging application are part of the messaging application, they may be implemented as plug-ins or add-ons to the messaging application or as a separate application with APIs to interface or communicate with a messaging application in order to implement the features and embodiments described herein.

The term "document" as used herein includes multimedia documents containing any combination of content types (e.g. slides, spreadsheets, text, images, audio, video, or combinations thereof). A document may comprise one or more document portions (e.g. a slide, page, spreadsheet, image, character/text string, audio segment, video segment or frame, or any combination of such portions) arranged in a desired sequence or order.

A document may have associated document-structure information. The document structure information may allow navigating and accessing the contents of the document and may also allow referring to a location within the document. For example, the document structure information allows specifying, accessing or referring to any portion of or object associated with a document. Moreover, the document structure information enables representing, accessing, manipulating, modifying, rendering, displaying and storing of the document. The document structure information may be created and provided by the document application. In another scenario the document structure information may be created by another application (e.g. messaging application) by parsing the document contents.

A Presentation service may be provided in a messaging application which enables a user of the messaging application to make a presentation for example of a multimedia document to other users of the messaging application. A user may initiate a presentation session from a user interface of a messaging application that supports presentation of a multimedia document, and may termination the session at any time. A presentation session may be targeted to or directed at one or more users of the messaging application. The user initiating, controlling and terminating the presentation session is referred to herein as a Presenter. A Presenter may also have ownership permission or access to the multimedia document being presented which may be stored in a database associated with the messaging application/presentation service or a document application. In one embodiment a presentation session may support commands and requests via messages e.g. a navigation command such as "next slide" or "Go to slide #7".

A group of users may be created in the messaging application expressly for a presentation session (e.g. by a user, a Presenter, or an administrator of the messaging application). A presentation session may also be targeted to a group of users that already exists. A group of users that is involved or associated with a presentation session is referred to herein as a presentation group. The presentation group includes the Presenter of the presentation session. The Presenter may at any time add a user to the presentation group or remove a user from the presentation group (e.g. users from contacts, address book of the Presenter). The Presenter may also give another user control of the presentation session. A user in the presentation group of a presentation session or receiving the presentation is referred to herein as an Audience member or Audience user. "Audience member" or "Audience user" may be used synonymously herein. A Presentation group includes all users participating in the corresponding presentation session, namely the Presenter of the presentation and Audience users/members receiving the presentation.

Figure 3:
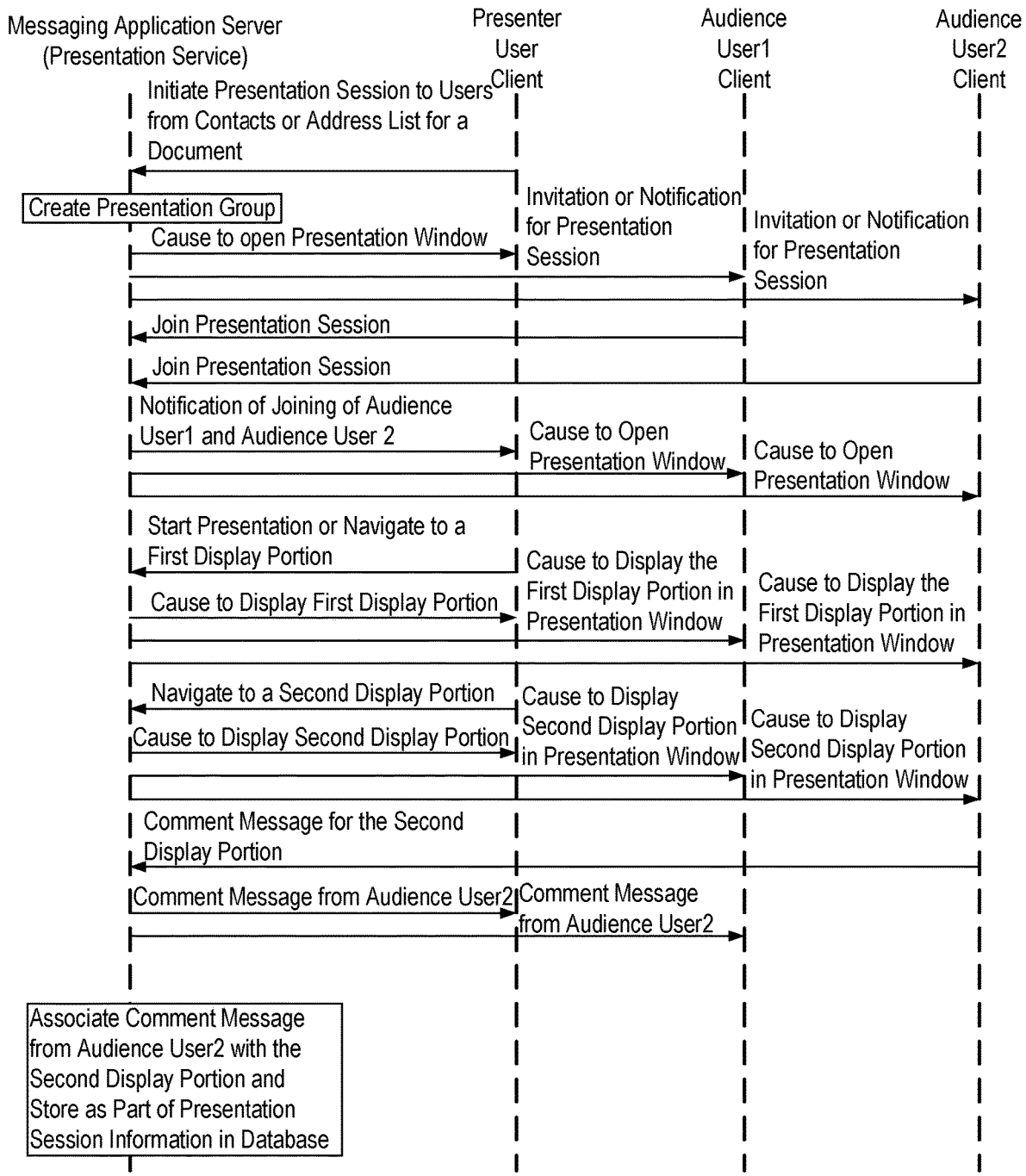
FIG. 3 shows a flow diagram 300 as an example to illustrate the information flows for supporting a presentation service in a messaging application in accordance with one embodiment.

A flow diagram 300 depicted in FIG. 3 is an example to illustrate the information flows for supporting a presentation service in a messaging application. The information flows in FIG. 3 are depicted as shown for clarity of illustration and are not necessarily synchronous or ordered (e.g. may occur asynchronously or simultaneously depending on implementation preferences). The number, sequence, order, timing and format of the information flows may vary (e.g. depending upon implementation preferences).

A Presenter may initiate a presentation session in a messaging application (see FIG. 3) to one or more users (e.g. from contacts or address list of the messaging application), for example, by a command input to the user interface or by activating a presentation identifier rendered in a view of a graphical user interface (e.g. hyperlink, uniform resource locator, uniform resource identifier). A graphical user interface, or "GUI," is the visible projection of a human-computer interface. A GUI can support different views to support different tasks, and each view can incorporate windows, icons, and menus in support of user interaction with a device or application.

In one example a Presenter may initiate a presentation session in a user interface for messaging another user, user group, or channel in the messaging application (e.g. via a message to another user, user group or channel). For initiating a presentation session, a document (e.g. provided or available in a message or in a document management view), may have a document identifier (e.g. a hyperlink, URI, URL) that may be activated on the user interface of the messaging application. In another example a command (e.g. an icon on the user interface) is provided by the messaging application which when activated displays documents available to a user for presentation (e.g. in a document management view) on the user interface and another command (e.g. icon on the user interface) to initiate a presentation session for a document chosen by the user where the user is allowed to choose, select or add one or more Audience users (e.g. from the contacts or address list of the user). In another scenario a user (e.g. Presenter user) is provided a command (e.g. icon on the user interface) by the messaging application to start a presentation session which when activated may provide an interface in which one or more Audience members may be selected from contacts or address list of the user and another command (e.g. icon on the user interface) is provided to select a document for the presentation session (e.g. a command/icon which when activated displays documents available to a user for presentation). The command (e.g. icon on the user interface) by the messaging application to start a presentation session may be included in any user interface supported by the messaging application (e.g. contacts, address list, chat channels, messaging groups, message history, message lists, chat history).

When a Presenter initiates a presentation session the messaging application causes a window to open on a user interface of the Presenter (see FIG. 3), in which to display the multimedia document for the presentation session. In this context, a "window" is a portion of a GUI view that presents its contents as visually independent of the rest of the view. The messaging application also creates a presentation group in association with the presentation session and sends an invitation or a notification to the one or more Audience users (see FIG. 3) in the presentation group (e.g. by providing the presentation identifier (e.g. hyperlink, URL, URI) via a message to an Audience user or a notification of the presentation session to an Audience user). An Audience user may join or participate in the presentation session by accepting the invitation (e.g. activating the presentation identifier e.g. hyperlink, URL, or URI received from the messaging application, or accepting a notification of the presentation session from the messaging application) and in response the messaging application causes a window to open on a user interface of the Audience user (see FIG. 3), in which to display the multimedia document for the presentation session. The messaging application (e.g. of a presentation service) may also send a notification to the Presenter of the joining of an Audience user in the presentation session. The window for a presentation session on a user interface of a user (e.g. Presenter or Audience user) provided by the document application is referred to herein as a presentation window.

The presentation of a multimedia document may be provided for display as one or more document portions (e.g. slide, page, spreadsheet, image, chart, character/text string, audio segment, video segment or frame or any combination of such portions), also referred to herein as display portions, for display in the windows corresponding to a presentation session on user interfaces. The display portions may have an associated sequence or order with respect to the displaying in the window corresponding to a presentation session.

A presentation service can access or request at least a portion or a display portion (e.g. slide, page, spreadsheet, image, chart, character/text string, audio segment, video segment or frame or any combination of such portions) of the document. A portion or display portion of the document may be accessed or requested by the messaging application from an associated database or a document application, storing and maintaining the document. In one example the associated database or storage holding/containing the document may be accessible and local to the client device corresponding to a Presenter. In this scenario the document may be accessed as whole or in portions, via the client application in the client device of the Presenter (e.g. by a push or pull mechanism), by the presentation service/messaging application in order to appropriately distribute as display portions to various presentation windows (e.g. of Presenter and Audience members). If the document is accessed in portions the document portions may be pushed or pulled, from the client application in the client device of the Presenter, as the Presenter navigates the document. For example, a display portion may be pushed from the client application of the Presenter to the Presentation service when the Presenter advances to that display portion. In another example display portions or the whole document may be pulled from the client application of the Presenter by the presentation service. Note that depending on implementation display portions may delivered/loaded ahead of time by the Presentation service of the messaging application to a client to be cached at the client and can be triggered or caused to be displayed in the presentation window by the presentation service when needed.

When the Presenter starts the presentation (e.g. using navigation commands for the presentation session on the user interface) the messaging application accesses at least a portion of the document for display in the window of the presentation session. The Presenter may navigate (e.g. using navigation commands for the presentation session on the user interface of the Presenter) to any portion or part within the document (or by default to the beginning portion if it is the start of a presentation) and that would trigger the messaging application to cause or trigger the display of the corresponding display portion of the document in the presentation window of the Presenter. Also, the messaging application (e.g. presentation service) may cause or trigger the content of the presentation windows (e.g. display portions) of Audience users to match or follow that of the Presenter (see FIG. 3). An Audience user may navigate (e.g. using navigation commands for the presentation session on the user interface of the Audience user) to other display portions of the document than the one displayed by the presentation window of the Presenter. An Audience user may at any time (e.g. with a command/control provided on the user interface of the Audience user, a navigation command to match or synchronize with the Presenter) return to the display portion corresponding to the latest or current display portion being displayed or presented in the presentation window of the Presenter.

Figure 4:
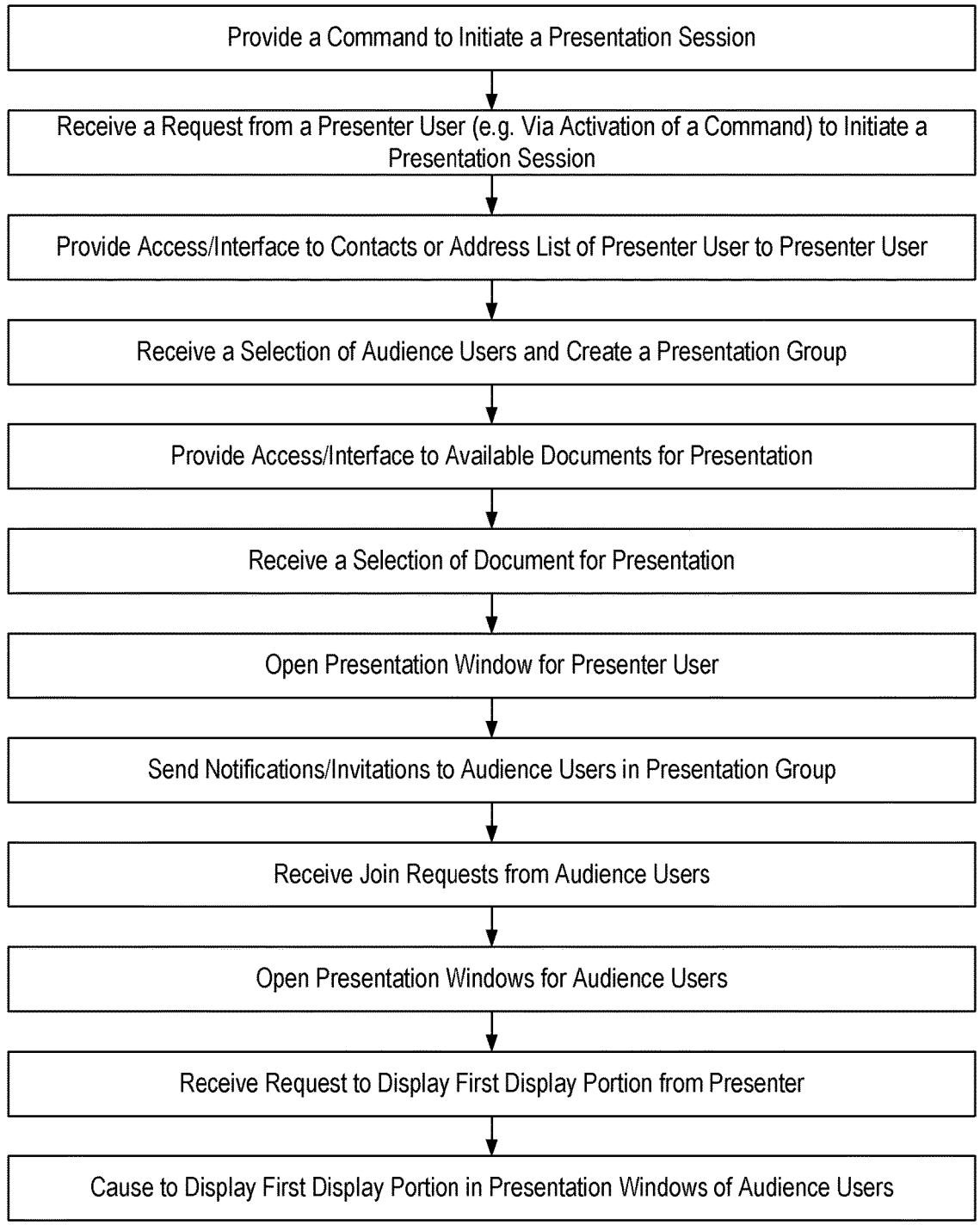
FIG. 4 shows a flowchart 400 illustrating an example process for supporting a presentation session in a presentation service of a messaging application.

The flowchart 400 shown in FIG. 4 illustrates an example process for supporting a presentation session in a presentation service of a messaging application. Messages (e.g. containing comments, questions, information, feedback etc.) from the users participating in a presentation session are referred to herein as comment messages. The rendering of a presentation session on a user interface of the messaging application includes at least one window for displaying the multimedia document (e.g. presentation window), and comment messages from the users participating in the presentation session. Comment messages may sometimes be referred to herein simply as comments. Comment messages may include any multimedia content (e.g. text, voice, image, audio, video). A comment message received from a user (e.g. a user in the presentation group which includes the Presenter) participating in the presentation session is associated (e.g. by the presentation service) with the display portion of the document currently displayed in the presentation window on the user interface of the messaging application accessed by the user (see FIG. 3).

Figure 5:
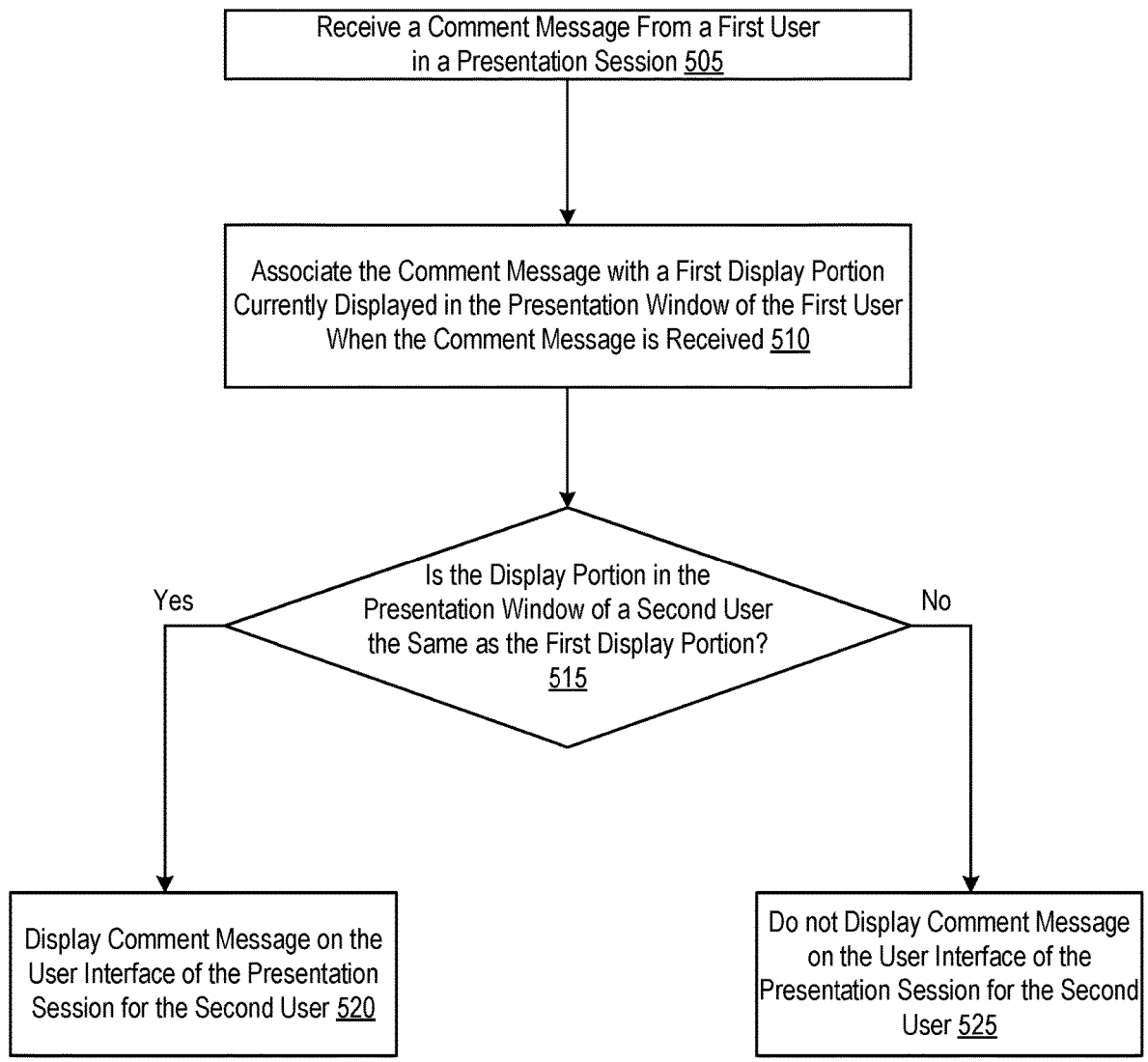
FIG. 5 shows a flowchart 500 illustrating an example process for handling comment messages for a presentation session in a presentation service of a messaging application residing on a messaging application server.

The flowchart 500 shown in FIG. 5 illustrates an example process for handling comment messages for a presentation session in a presentation service of a messaging application residing on e.g. messaging application server 115 (FIG. 1). The process begins at 505 when the messaging application receives a comment message from a participant of a presentation session (e.g., the presenter). At step 510, the comment message is logically associated with a first display portion of a presentation window of the participant who sent the comment message. This association can take place at the receiving device, or the comment can be sent with information identifying the corresponding display portion or document. The logical association can be stored by the presentation service on messaging application server 115 or in an associated database. The logical association can also be propagated to client applications involved in the presentation session for use during and after the session.

The comment messages displayed (e.g. caused to be displayed by the presentation service) on the user interface of a user in a presentation group correspond to the document portion currently displayed in the window of the presentation session (see FIG. 5). So when a user navigates to a specific display portion of the document (e.g. a display portion already presented by a Presenter) the comment messages associated with that display portion are displayed (e.g. caused to be displayed by the presentation service) on the user interface.

The messaging application determines in decision 515 whether the display portion of the second user's user interface is the same content as the display portion of the user interface of the first user from whence the comment message was received. If so, then the comment message received in step 505 is displayed on the second user's interface (step 520). If not, then the comment message received in step 505 is stored but not displayed (step 525). The received comment can later be accessed when e.g. the second user navigates to the display portion associated with the received comment message.

During the presentation session user comments (e.g. comments, questions, information, feedback etc.) received for each display portion from users in the presentation group are stored and associated with that display portion by the messaging application (or presentation service). The user comments and a mapping of user comments to display portions of the document are stored and maintained in a database associated with the messaging application. The display portions of a presentation session may be associated with a Presentation session ID for that presentation session, and stored and maintained in a database associated with the messaging application. The Presenter after initiating a presentation session may stop or end the presentation session at any time. A record or history for a presentation session and associated information (e.g. with a time stamp, presentation session ID, Presenter ID, presentation group user IDs, display portions, comment messages, and post-session changes) is stored and maintained by the messaging application in an associated database.

An identifier (e.g. hyperlink, URL, URI) or a command may be provided by the messaging application on a user interface to a user (e.g. Presenter or a user with appropriate access permission) for a stored presentation session which may be used by the user to repeat, reprise or continue a previous presentation session. If a presentation session is initiated to repeat, reprise or continue a previous presentation session then the information stored from the previous presentation session is accessed from the associated database(s) and displayed as needed on the user interfaces of users in the presentation group. Comments relating to multiple presentation sessions of the same document can be collected and stored with their links to display portions of the document. For example, in a repeated presentation when a display portion is displayed in the presentation window the comments logically associated with that display portion from a previous presentation session may be displayed in the comments window.

Note that depending on implementation comment messages associated with display portions may be delivered/loaded ahead of time by the Presentation service of the messaging application to a client to be cached at the client and can be triggered or caused to be displayed along with the associated display portions by the presentation service when needed. Each user comment received by the messaging application for a display portion is included in the renderings of the presentation session for user interfaces (e.g. caused or effected by the presentation service) of the other users in the presentation group in association with that display portion.

Figure 6A:
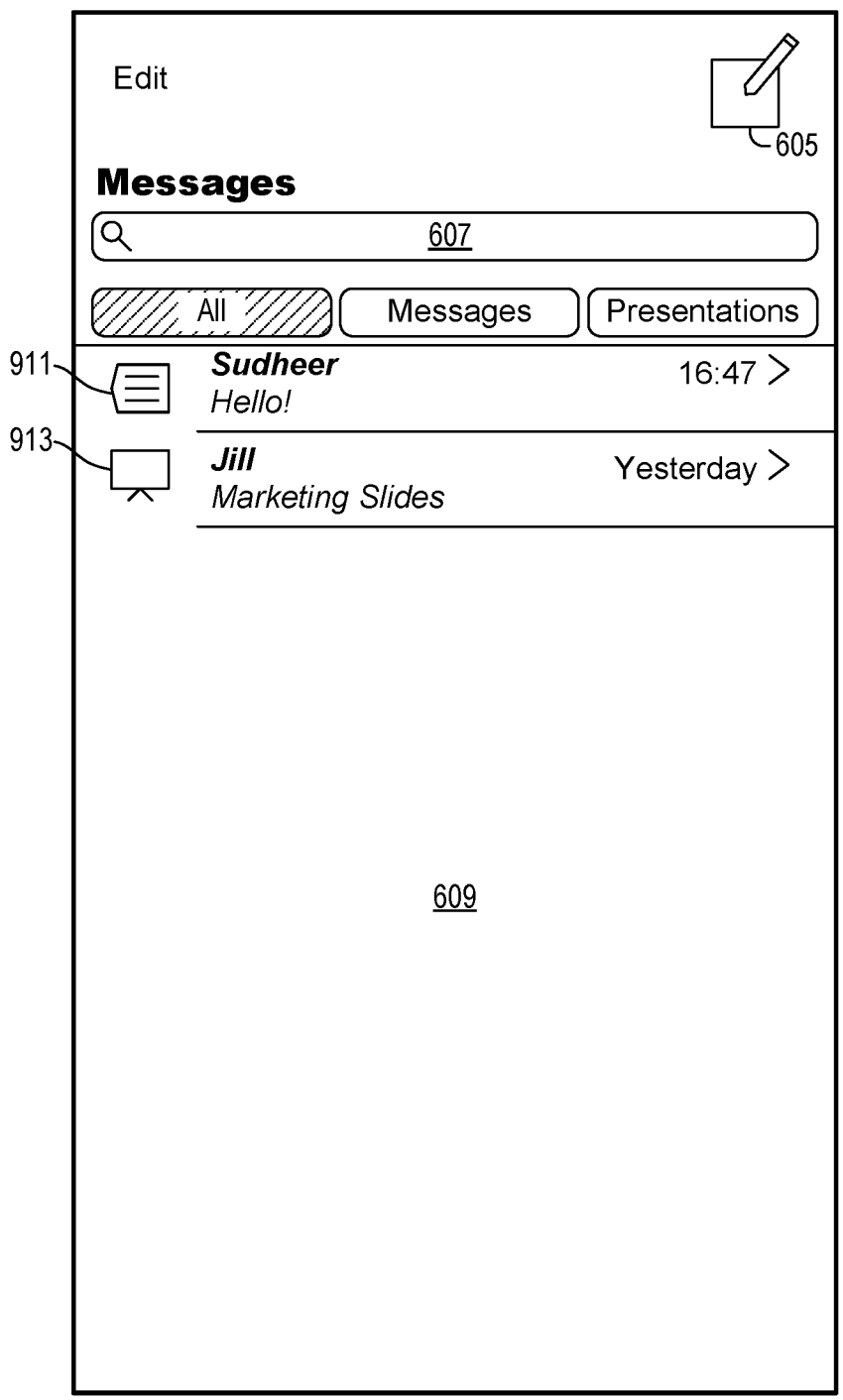
FIG. 6A shows a message-initiation view of a graphical user interface 600 for a messaging application that incorporates an ability to share a presentation among messaging participants.

FIG. 6A shows a message-initiation view of a graphical user interface 600 for a messaging application that incorporates an ability to share a presentation among messaging participants. User interface 600 displays, on a client presentation device, various well-known fields and icons, including an edit link Edit, a new-message icon 605, and a search field 607. User interface 600 also includes a window 609 that presents lists of past messages and presentations by contact name and time. A past presentation (or presentation session) attended or presented by the user may also be listed in window 609 to enable the user to repeat, reprise or continue the past presentation. When an "All" icon is selected window 609 lists both messages and presentations, distinguishing between them using a message icon 911 and a presentation icon 913. The user can join active presentation sessions or view or review past presentations by selecting them in window 609. The user can likewise delete presentations using this interface. Other types of messaging might also be facilitated and listed in other embodiments. A user wishing to send a message to one or more recipients or initiate a presentation to one or more audience members begins the process by selecting new-message icon 605, which causes user interface 600 to accept a message-initiation command.

Figure 6B:
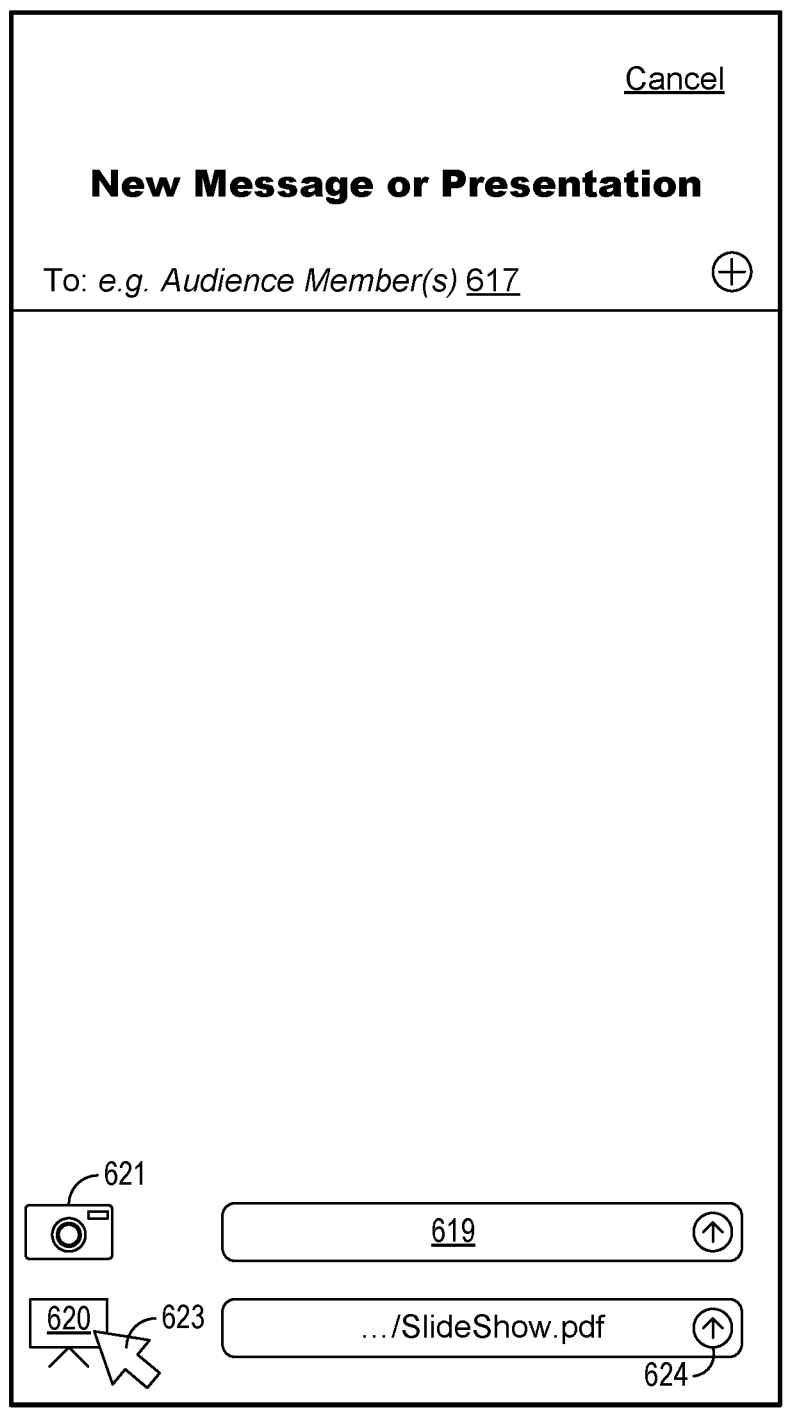
FIG. 6B shows a graphical user interface 615 that offers an example of a message-creation view presented responsive to a user interacting with new-message icon 605 of FIG. 6A.

FIG. 6B shows a graphical user interface 615 that offers an example of a message-creation view presented responsive to a user interacting with new-message icon 605 of FIG. 6A. As with conventional messaging applications, user interface 615 allows the user to select messaging recipients in a recipient field 617, enter a message in a message field 619, and select a photo using a photo icon 621. In addition, user interface 615 allows the user to select a presentation icon 620 to call up e.g. a slideshow for presentation to audience members specified in recipient field 617. A cursor 623—an arrow—illustrates selection of presentation icon 620, though e.g. a touch interface, stylus, or dedicated key may also be used. Another icon 624 allows the user interface to accept a presentation-initiation command from the presenter.

Figure 7A:
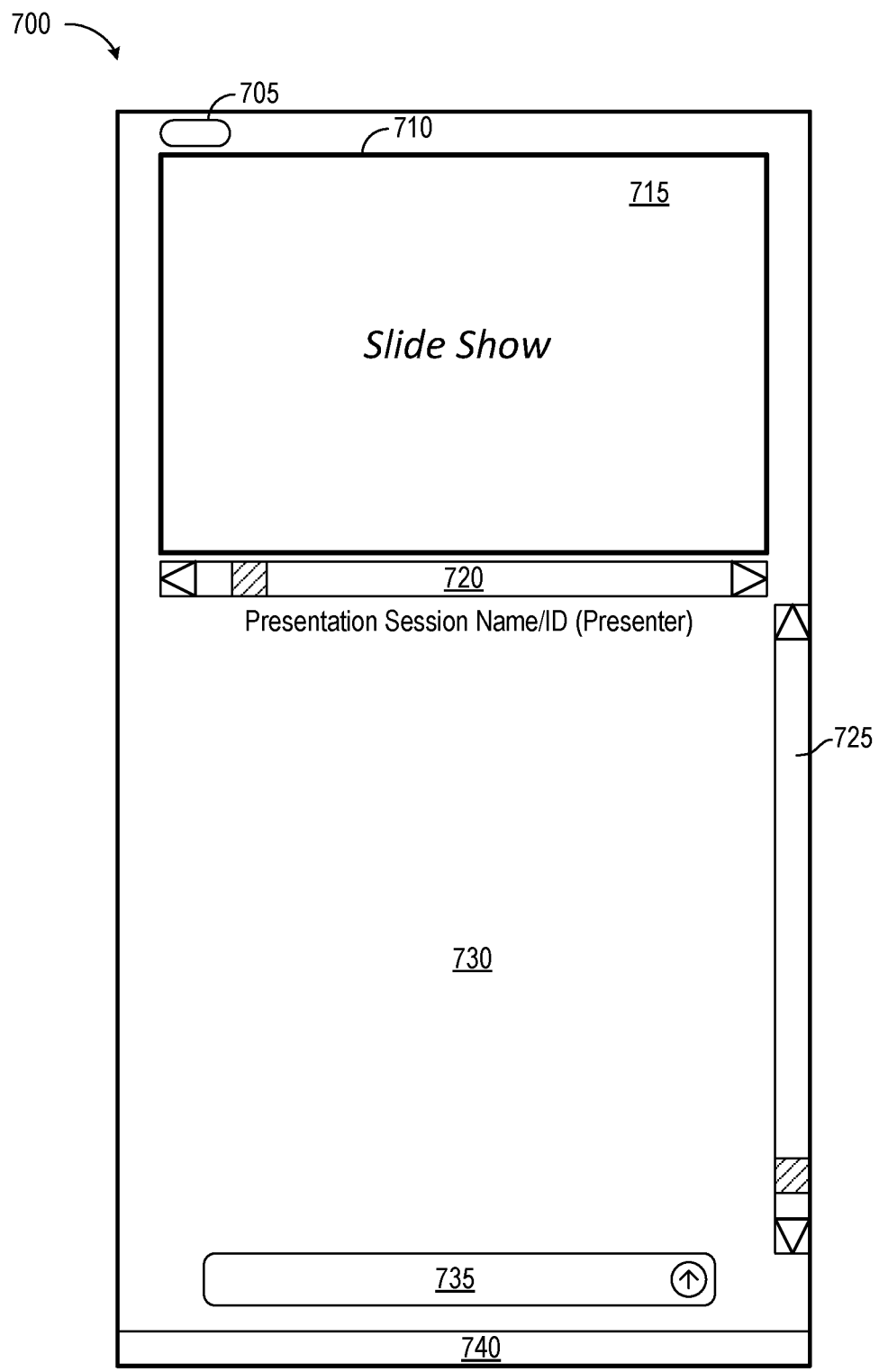
FIG. 7A shows a graphical user interface 700 that offers an example of a presentation view displayed responsive to a user interacting with icons 620 and 624 of FIG. 6B to select a presentation.

FIG. 7A shows a graphical user interface 700 that offers an example of a presentation view displayed responsive to a user interacting with presentation icon 620 of FIG. 6B to select a presentation, such as a file containing a sequence of slides, and initiating a presentation session via icon 624. User interface 700 exemplifies a presentation session on a client device for a Presenter of a presentation session. User interface 700 includes a menu key 705, or icon, for functions supported by the presentation service (e.g. adding and removing audience members, hiding comments, ending and storing presentation session); a presentation session window 710 encompassing a first presentation area 715 depicting a title slide entitled "Slide Show" associated with a presentation session; a navigation bar 720 with forward and reverse icons; a scroll bar 725 for scrolling messages; a second presentation area 730 for viewing messages; a user-input field 735 for message entry (e.g., comment messages); and a menu bar 740 for the messaging application. Though not shown, user interface 700 can depict a full or truncated list of message recipients (e.g. audience members).

Figure 7B:
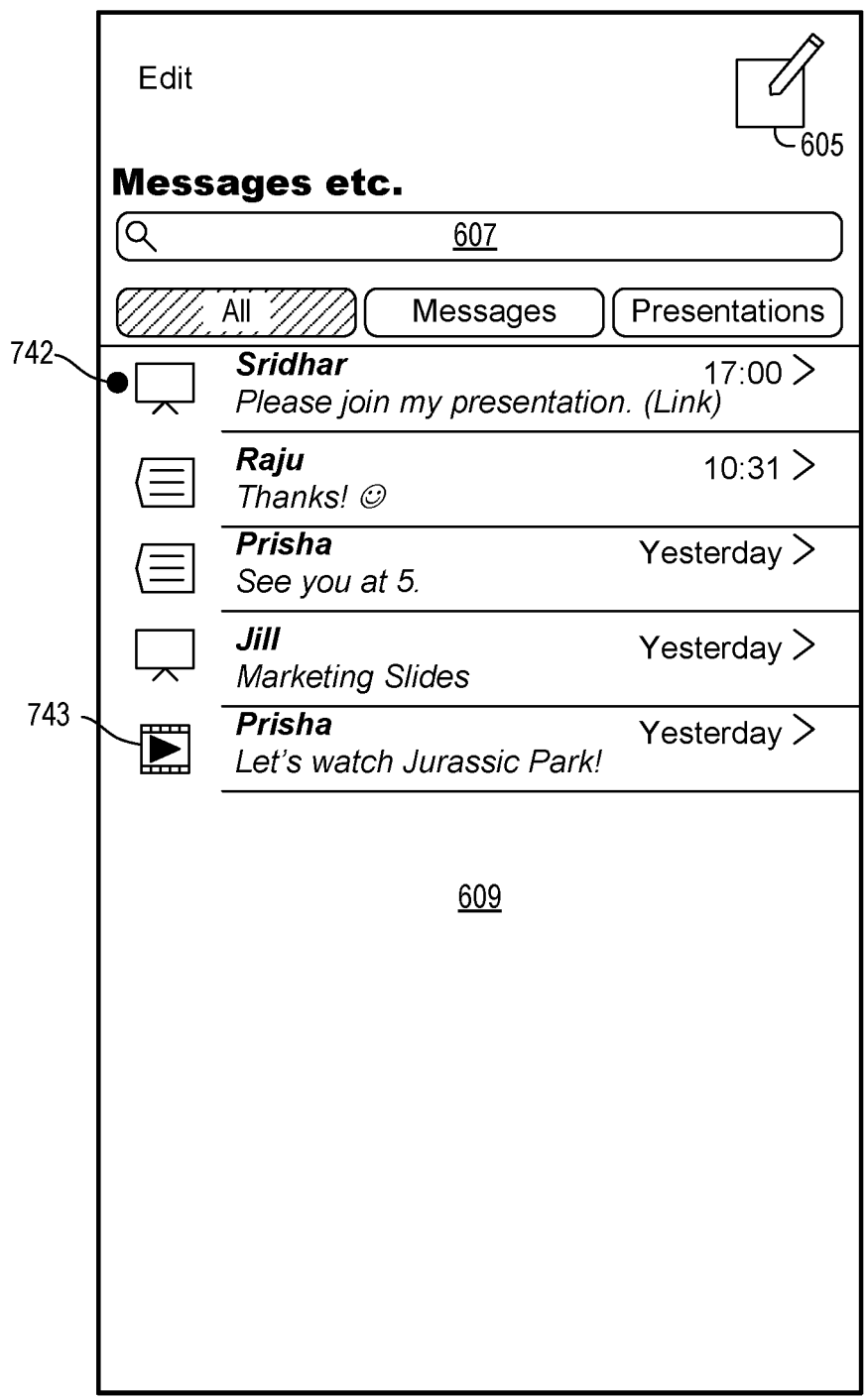

FIG. 7B shows a graphical user interface 741 for a messaging application like that of FIG. 6A but from the perspective of an audience member, with like-identified elements being the same or similar. Window 609 is a messaging view shown with the audience-members list of past messages and presentations by contact name. A newly arrived invitation message with an invitation to attend a presentation is identified as unread via a dot 742 that is absent from messages that have been read. The area of the newly arrived invitation message supports a link to the presentation session so that the audience member can join the session by selecting the message. The area that responds to user interaction to call up the presentation session can be limited to e.g. the presentation icon in other embodiments. The message recipient can thus easily respond via either a message or by joining the session or calendaring the session for a time specified by the Presenter. The last message in window 609 includes an icon 743 that identifies a presentation session specific to a shared video rather than e.g. a slide show. Thus messages for presentation sessions can have icons identifying the type/nature of document being presented. In some embodiments a user can forward a presentation to another user based on permissions that can be established by the Presenter.

Figure 7C:
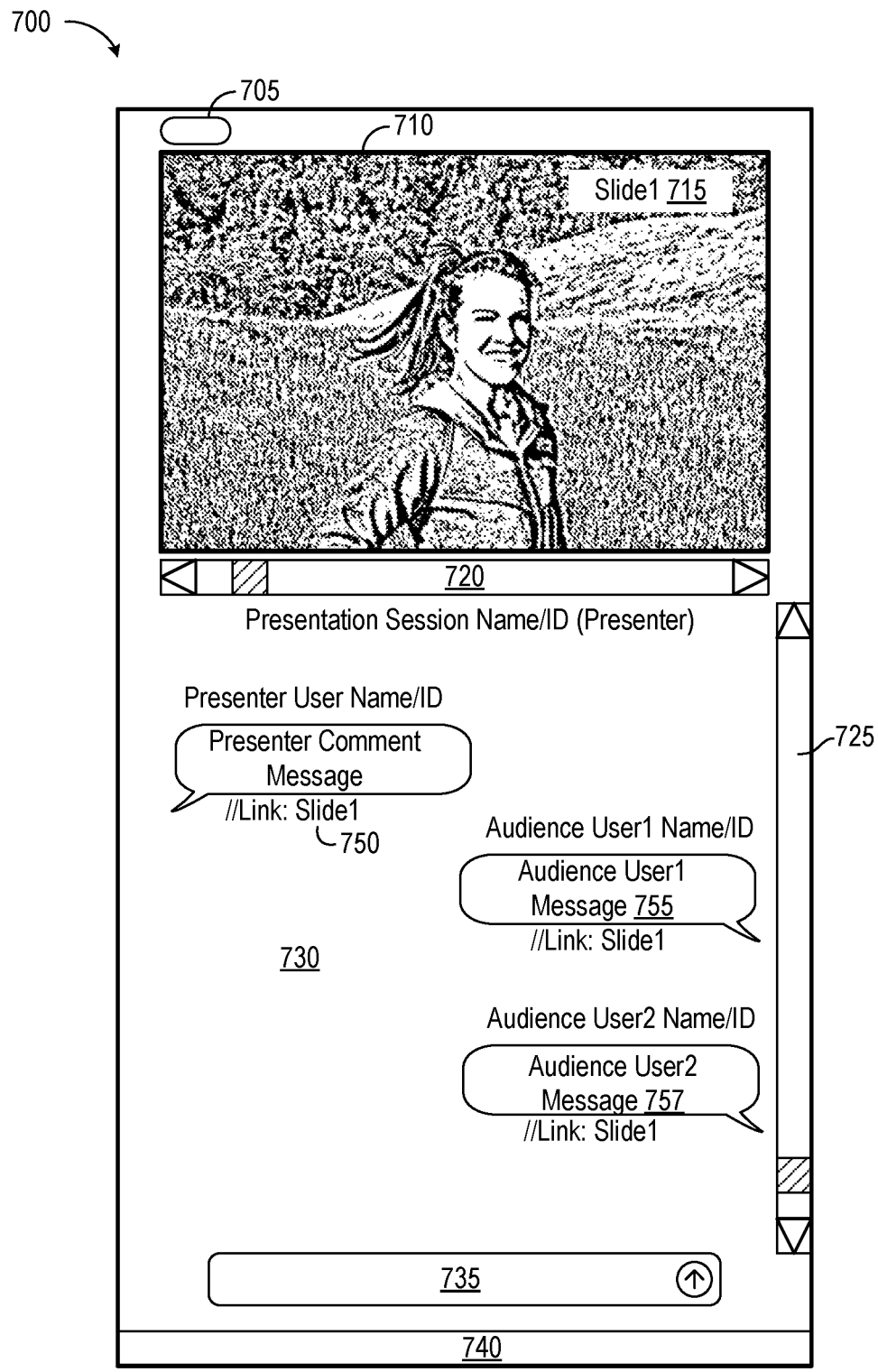
FIG. 7C shows user interface 700 of the Presenter, introduced in FIG. 7A with presentation area 715 advanced to a first slide Slide1 and second presentation area 730 encompassing three messages that relate to slide Slide1, one comment message from each of the Presenter and two audience members Audience User1 and Audience User2.

FIG. 7C shows user interface 700 of the Presenter, introduced in FIG. 7A with presentation area 715 advanced to a first slide Slide1 and second presentation area 730 encompassing three messages that relate to slide Slide1, one comment message from each of the Presenter and two audience members Audience User1 and Audience User2. The Presenter can interact with user interface 700 to present a sequence of images (e.g. a slide show, video, or document) that appears in presentation area 715. The sequence of images, including e.g. the depicted first image Slide1 of a young woman, is stored in a presenting computer that is integrated with or remote from the device supporting user interface 700 and available to the Presenter and Audience members via the messaging application. In the example of FIG. 1, the presenting computer can be one of client devices 110 with the sequence of images stored in local memory, in one of databases 125 and 130, or in some combination of these and other storage resources. Message and slide sharing and synchronization can be coordinated by messaging application server 115, document application server 120, or both.

Note that a comment message from a user is associated with a corresponding display portion and the rendering of the comment message on a user interface is dependent on the corresponding user. For example the comment messages of a user on a user interface corresponding to the user are listed and aligned to the left of the user interface area. Whereas the comment messages of a user in a presentation group, on a user interface corresponding to another user in the presentation group are listed and aligned to the right of the user interface area. In general the rendering of a comment message on a user interface is dependent on the user corresponding to the user interface.

The comment from the presenter, at column left, was entered via field 735 for presentation in second presentation area 730 while slide Slide1 was depicted in area 715. The messaging application captured this contemporaneous sense by storing a link 750 associating the first comment from the presenter and the first slide Slide1. The link need not be visible to the user. In one embodiment, for example, the user interacting with the area of a message associated with a link may automatically retrieve the associated image, if any. Messages 755 and 757 from audience members User1 and User2, received as slide Slide1 was evident in area 715, are likewise visibly or invisibly linked to slide Slide1. Link 750 can be stored by the messaging application as part of the presentation session information in e.g. an associated database and distributed to client devices 110 as needed during the presentation session. Client devices can also store link 750 and other session information.

The Presenter can advance to the next slide by interacting with e.g. navigation bar 720 to input a next-slide presentation command. The client device 110, responsive to this command, issues a notice to the messaging application that the presenter is advancing to the next slide, thereby allowing the messaging application (presentation service) to alert audience-member clients. These and other messaging and presentation notices can be conveyed via messaging application server 115. In other embodiments, messaging and presentation-related communications can be routed via a messaging service that is otherwise uninvolved with the presentation session. In one embodiment, for example, all communications for a presentation session can be routed between client devices using Multimedia Messaging Service (MMS) messaging.

Figure 7D:
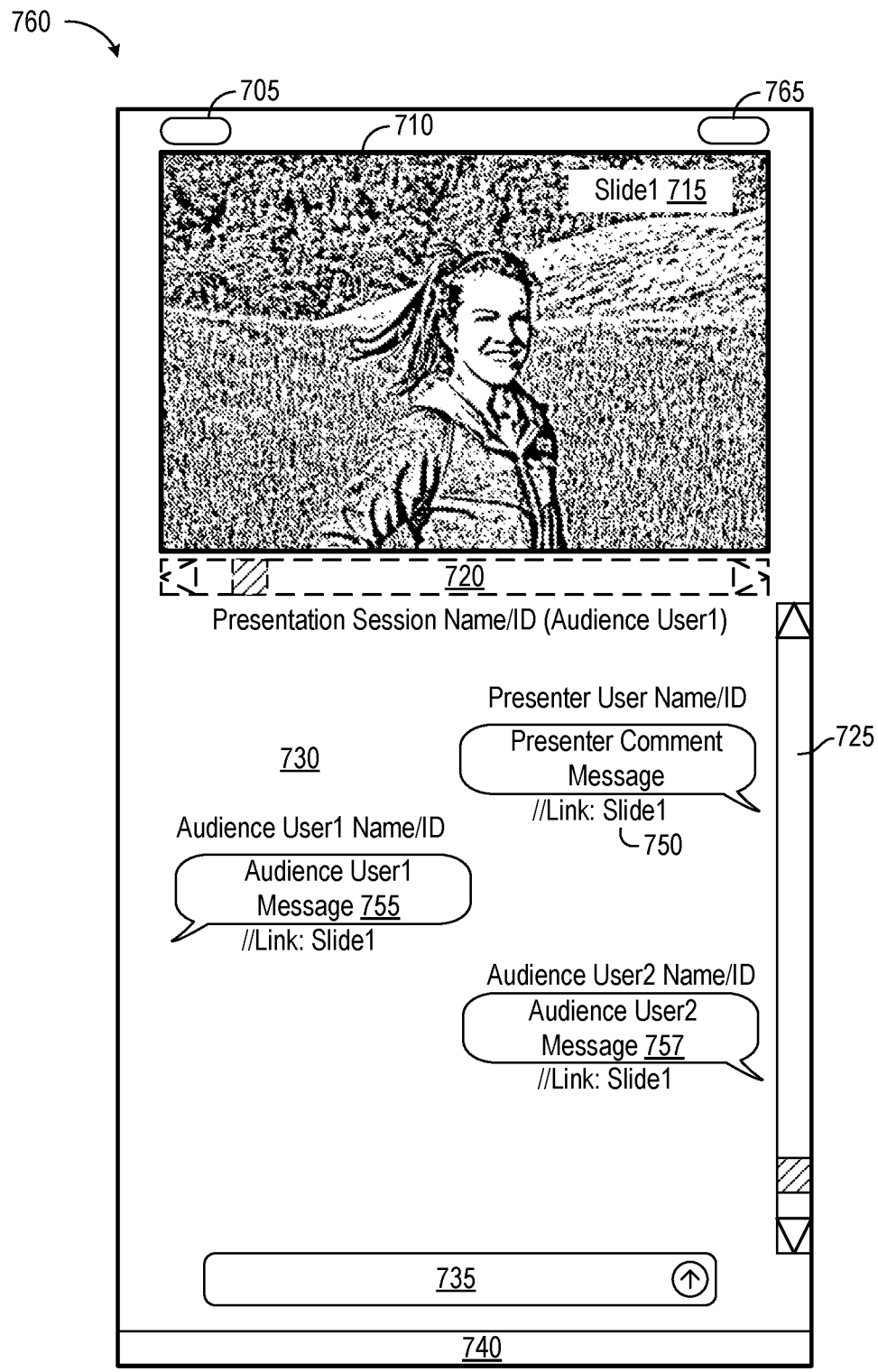
FIG. 7D illustrates an Audience-member view of a user interface 760 for the presentation session set up by the Presenter in the example of FIG. 7A.

FIG. 7D returns to the perspective of the audience member with a view of a user interface 760 for the presentation session set up by the Presenter in the example of FIG. 7A. User interface 760 is similar to user interface 700 of FIG. 7C, with like-identified elements being the same or similar, but the audience view of user interface 760 places the audience member's comments at the left of second presentation area 730. This example shows presentation area 715 advanced by the remote Presenter to first slide Slide1 and second presentation area 730 encompassing the three messages introduced in FIG. 7C as being related and linked to slide Slide1. User interface 700 displays slide Slide1 in presentation area 715 in the same manner as the presenter's user interface (see FIG. 7C). User interface 760 can be synchronized with user interface 700 so that both the Presenter and Audience member are viewing the same slide or the two user interfaces can be controlled independently so that participants can control, comment on, and annotate different display portions and comments. The example of FIG. 7D shows the same three messages from the example of FIG. 7C but distributed so that the messages from Audience member User1 are shown at the left and messages from other participants are shown at right. An icon 765 at the upper right (or elsewhere) allows the user to selectively decouple local navigation bar 720 from the sequence of slides. Navigation bar 720 is, by default, disabled on audience-member devices to allow the audience-member user interface to step through the presentation responsive to notices or commands relaying actions of the Presenter (e.g., actions of advancing a page or slide). Audience members can take control during and after the presentation e.g. by enabling local scrolling and issuing an instruction to disregard subsequent notices or commands initiated by the Presenter (e.g. via icon 765). In one embodiment selecting a comment to a display portion that is not depicted in area 715 automatically issues such an instruction. Presenter notices or commands that are ignored may be stored to allow the audience member to react later, such as to resynchronize the presentation session by e.g. issuing a synchronization instruction via e.g. key 705 or icon 765. The Presenter can also transfer or share control of the presentation to an audience member in other embodiments.

Figure 7E:
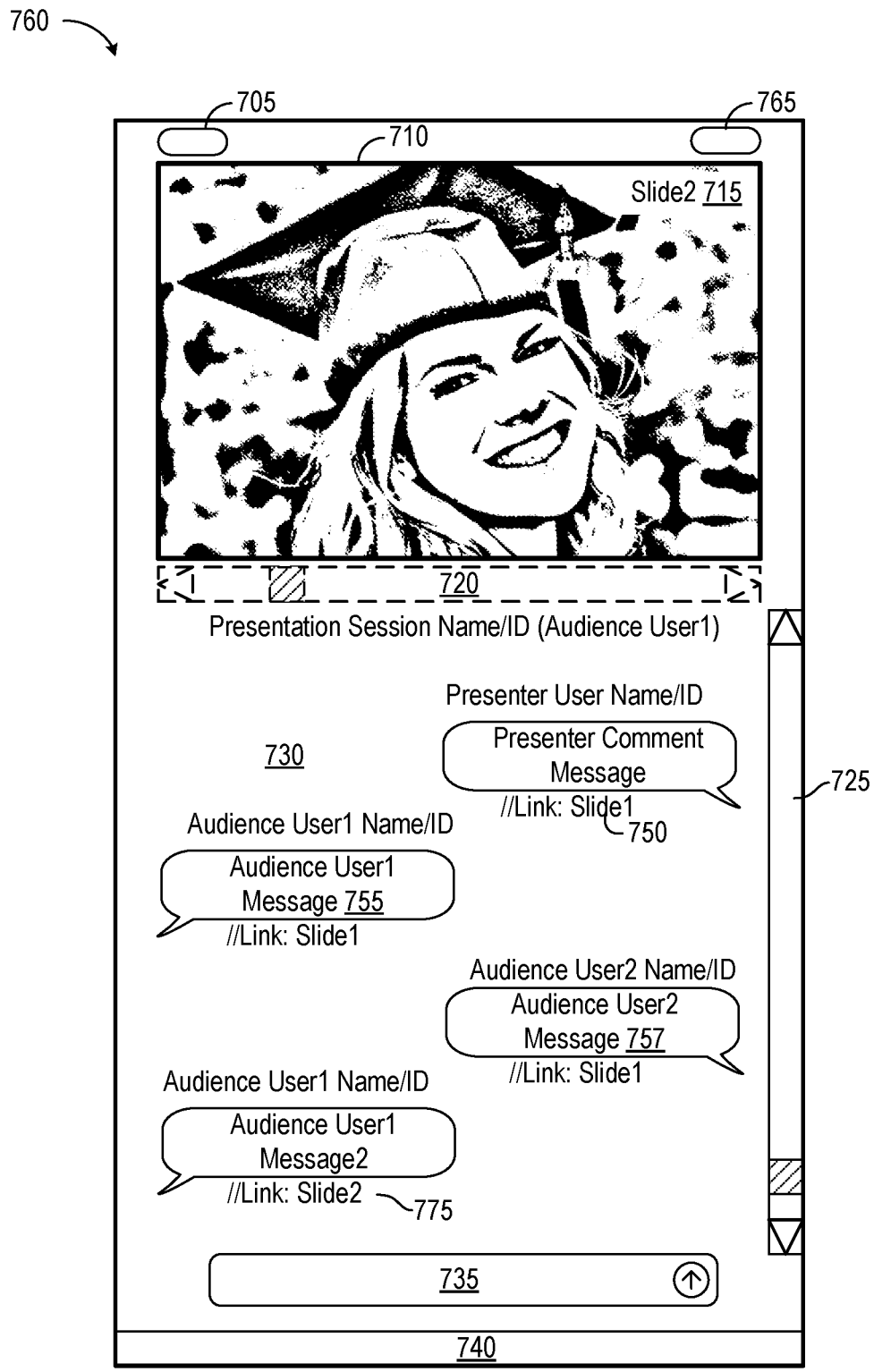
FIG. 7E illustrates an Audience-member view of user interface 760 updated to include a second slide Slide2 in the sequence of slides.

Turning to FIG. 7E, again from the Audience-member perspective, user interface 760 is shown to have received a second slide Slide2 in the sequence of slides and displayed the second slide in presentation area 715. A second comment from Audience User1 labeled Message2, at column left, was entered via field 735 for presentation in second presentation area 730 while second slide Slide2 was depicted in area 715. The client device captures this contemporaneous sense by storing a link 775 associating the second comment from Audience member User 1 with the second image Image2, and by sharing link 775 with the messaging application to be included as part of the session information. Audience member User1 will thus be able to scroll though his or her messages to find comments that relate to slides of interest. By default, comments logically associated with the slide currently displayed in the presentation window 715 are displayed in the second presentation area 730. The messaging application can share link 775 with other client devices to allow other participants to likewise peruse comments in relation to linked slides.

Slides can be linked to comments in the same way that comments are linked to slides, in which case the user can scroll through the sequence of images to locate corresponding comments. In some embodiments the user can, e.g. via menu key 705, select a synchronization mode in which scrolling via either navigation bar 720 or 725 scrolls images in association with linked comments. Links can also be shared among users with message content so that all messages are linked to corresponding display portions. In some embodiments comments and links can be selectively hidden from some or all of the presentations participants.

Figure 7F:
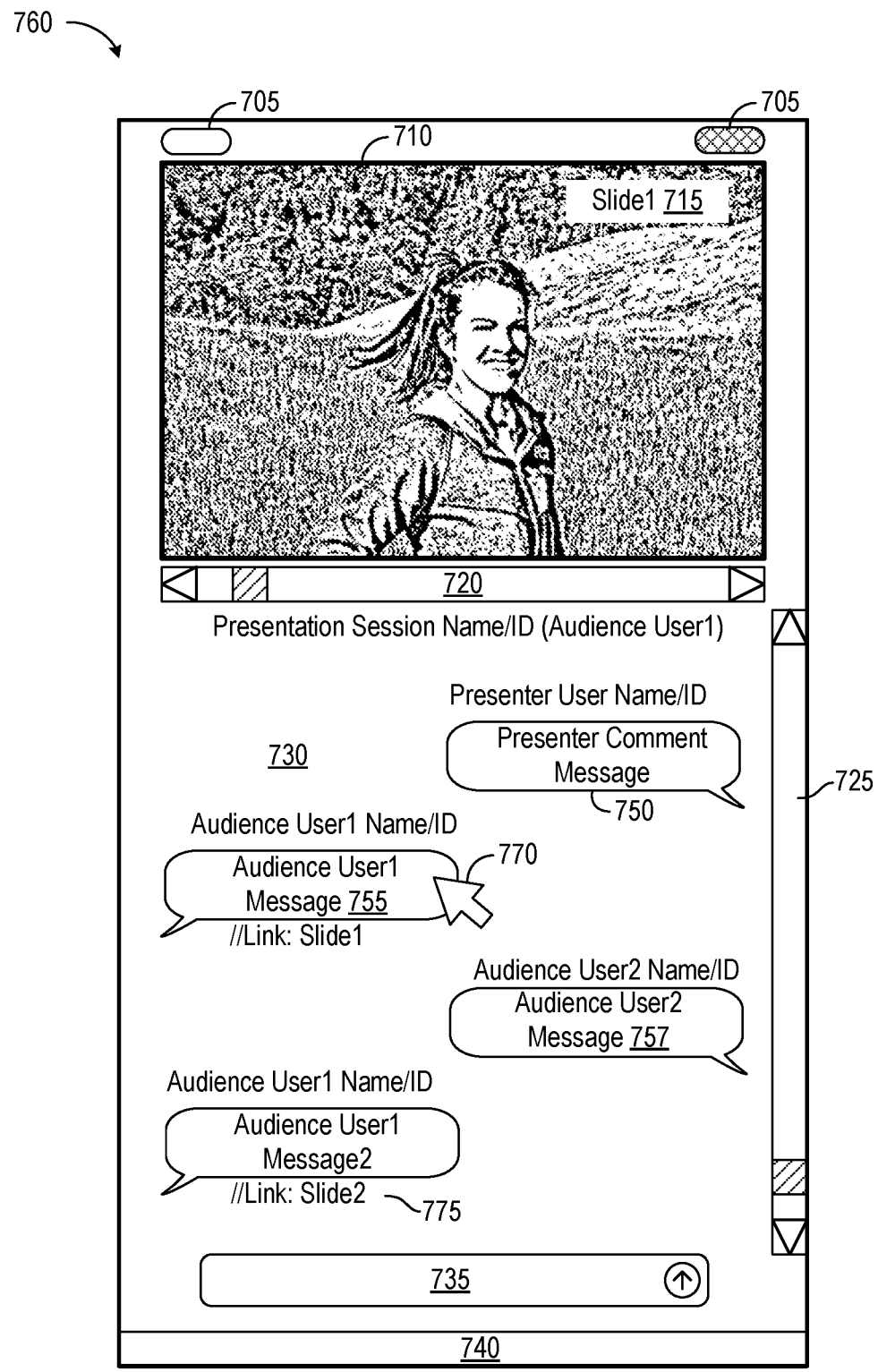
FIG. 7F shows user interface 760 of FIG. 7E with a cursor 770 hovering over the area of message 755 with a link to slide Slide1.

FIG. 7F shows user interface 760, still from the Audience-member perspective, with a cursor 770 hovering over the area of message 755 with a link to slide Slide1. Selecting the link, as by clicking a mouse with cursor 770 so positioned, issues a command from user interface 760 to the presenting client device to display a second instance of first slide Slide1, as shown, in first presentation area 715. The user can then add a third comment (not shown) in presentation area 730 that would be automatically linked to first slide Slide1.

In some embodiments messages can be grouped in time or can be grouped by display portion. In still other embodiments the user of each device can group comments by any combination of time, image, and user name/ID. These and other settings can be changed by interacting with e.g. key 705 or menu bar 740.

Some embodiments allow users to review past presentations, add comments and even modify comments made by the user if any in the past presentation. Comments made during reviews of past presentations can be captured and stored with the presentation session information or as an update to the presentation session information.

The messaging application may provide a presentation view for a user participating in a presentation session in which it may render (e.g. caused or effected by the presentation service) the presentation window and comment messages. The messaging application may also provide a document management view on the user interface for a user to access and manage documents and avail features and functionalities for documents as provided by the presentation service (e.g. "convert to presentation" applied to a document). The presentation view and document management view are rendered by the messaging application on the user interface in the context of the presentation service associated with the messaging application.

In another scenario the comment messages may be displayed by the messaging application in a separate window dedicated for comment messages of a presentation session. A user may also hide or reveal comment messages from view in a presentation session using a command provided by the messaging application for that purpose on the user interface.

The messaging application may enlarge for display on the user interface the area on the user interface where a comment message is being composed. Also, the presentation window itself may be enlarged by the messaging application for display on the user interface (e.g. to accommodate relatively large portion, element or object of the document). The messaging application may enlarge the presentation window for display in response to a command or gesture received on the user interface (e.g. a command icon, a tapping or pinch-out gesture on a touch screen display). The presentation view and document management view are rendered by the messaging application on the user interface in such a way that a user may scroll (e.g. see FIG. 7B) or manipulate the touch screen display with gestures so as to access parts of the views that may not be visible (e.g. due to the views not fitting entirely within the size of the display screen).

The Presenter may control (e.g. with a command/control provided on the user interface of the Presenter) a presentation session such that users in the presentation group other than the Presenter can navigate only within or to display portions already presented or displayed on the Presenter's user interface. When a Presenter activates this control the messaging application (e.g. presentation service) in response causes users in a presentation group other than the Presenter to be restricted to navigation within or to display portions already presented or displayed on the Presenter's user interface. In another scenario a presentation service may (e.g. configured by default) restrict a presentation session such that users in the presentation group other than the Presenter can navigate only within or to display portions already presented or displayed on the Presenter's user interface.

The document or portions of the document for presentation in a presentation session may be accessed by the messaging application from a database associated with the messaging application. In another scenario the document or portions of the document for presentation in a presentation session may be accessed by the messaging application from a document application or a third-party application.

A document may be received by a messaging application (e.g. via a message or via an API provided by a document application or a third-party application) and stored in an associated database. A messaging application may provide a "convert to presentation" command on the user interface that is associated with the received document (e.g. in a document management view). When this command is activated by a user the corresponding Document may be parsed by the messaging application and an associated document structure information is created and stored for that user in an associated database along with the document. In addition the messaging application in parsing the received document may organize the document in arbitrary portions or display portions for display in the windows corresponding to a presentation session. In another scenario a document application (or a third-party application) may provide the document to the messaging application organized in display portions suitable for displaying in a presentation window.

In one embodiment the functionality corresponding to the "convert to presentation" command may be provided/executed on a client device (e.g. as part of the client application corresponding to the messaging application) especially when the document is available at the client device (e.g. via local or remote storage/database, via an API provided by a document application or a third-party application).

Figure 8:
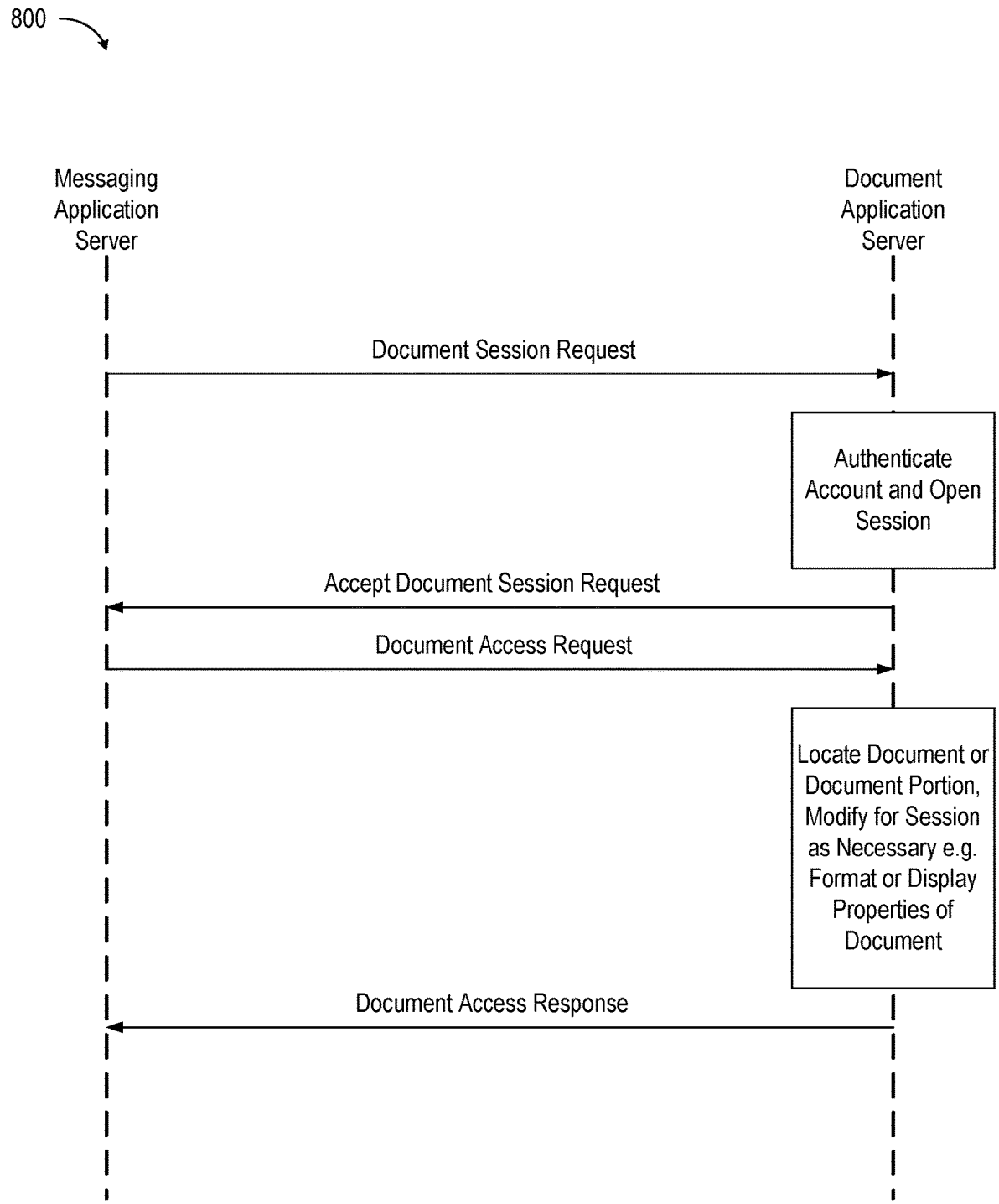
FIG. 8 depicts a flow diagram 800 as an example to illustrate the information flows for supporting document access from a document application by a messaging application (e.g. a presentation service of a messaging application).

FIG. 8 depicts a flow diagram 800 as an example to illustrate the information flows for supporting document access from a document application by a messaging application (e.g. a presentation service of a messaging application). The information flows in FIG. 8 are depicted as shown for clarity of illustration and are not necessarily synchronous or ordered (e.g. may occur asynchronously or simultaneously depending on implementation preferences). The number, sequence, order, timing and format of the information flows may vary (e.g. depending upon implementation preferences).

If a document is to be accessed from a document application the messaging application sends a document session request to the document application (see FIG. 8) to initiate document access along with (or followed by) document session information which may include one or more information items such as document ID (identifier) for the document, version, date, timestamp. In addition, the document session information may also include a user ID (e.g. Presenter's/user's account ID for document application) and/or a user account code (e.g. Presenter's/user's account password for document application). In response the document application may do one or more of the following: authenticate the user/Presenter ID, accept the request for document session, open a document session with a document session ID, locate the requested document (e.g. based on document ID received). The document application may send one or more of the following information to the messaging application: acknowledgement of request, denial of request, confirmation or acceptance of request, document session information (e.g. session ID, date, timestamp, document ID) created for this document session.

If a later or different version of the document is discovered by the document application, it may suggest or push such a later or different version of the document to the messaging application. The messaging application may accept or reject a later or different version of the document suggested by the document application.

The messaging application may send to the document application, a document access request along with (or followed by) document access information which may include document properties or attributes. The document access information may include one or more information items such as session ID, document ID, document structure information, identifier for a portion of the document, document size, document format type (e.g. slide format, spreadsheet format, xls, ppt, pdf, rtf), and display parameters for the client device. The document access information sent to the document application reflects the preferences of the messaging application for supporting a presentation session for the document in the messaging application.

The messaging application may send to the document application, in the document session information or document access information, information such as: (1) one or more client device type or category information items (2) one or more information items on rendering and display properties. This information may be related to or even included as part of the document structure information.

A previous (e.g. last or recent) document session ID may also be sent by the messaging application to the document application in the document session information or document access information.

The document application may create a document copy to send to the messaging application from the original document (located based on the document ID received in the document session information from the messaging application) and apply modifications to the document copy to satisfy when possible the preferences of the messaging application reflected in the received document access information. For example the document application may change the size or format type of the document copy based on the received document access information. In another example the document copy may be modified to at least partially satisfy the document structure information in the received document access information. The document application then creates or updates document access information (which may include document properties or attributes) for the document copy it is ready to send to the messaging application. In response to a document access request the document application may send or provide to the messaging application a document (e.g. document copy) or at least a portion of it. The document application may send to the messaging application, the document access information for the document it provides (e.g. the document copy) to the messaging application (the messaging application may use this information for a presentation session for the document received), which may include one or more information items such as session ID, document ID, document structure information, identifier for a portion of the document, document size, document format type (e.g. slide format, spreadsheet format, xls, ppt, pdf, rtf) and display parameters for the client device. The messaging application may use the document access information received from the document application for the document it provides, to support a presentation session for the document in the messaging application.

In response to a first document access request the portion of the document sent may be the initial portion/part of the document or may simply default to the initial portion/part of the document if the portion within the document is not specified by the messaging application. If the document portion within the document is specified by the messaging application then that specific portion of the document is sent from the document application to the messaging application. In response to subsequent document access requests, if the document portion within the document is not specified by the messaging application, after at least a portion of the document was sent previously in the document session to the messaging application, then the document application defaults to sending the portion of the document following the portion most recently sent in sequence or order. Also, if a previous document session may have been stopped or interrupted before accessing the document completely then a subsequent document session is started from the portion or location in the document where the previous document session was stopped or interrupted. A document session may be stopped by the messaging application by sending a request to stop the document session to the document application.

A document session for accessing a document from a document application and a presentation session for the document in a messaging application may run simultaneously or otherwise overlap. However the document session should provide portions of the document in time for display in the presentation window in the presentation session. In this overlapping scenario dynamic influences or interactions between the presentation session and the document session may be introduced in various ways for performance advantages. For example the document size may be altered for in time delivery of document portions. In another example dynamically changing needs of the client devices in a presentation session may be reflected in the document session to modify the document or its portions accordingly (e.g. the quality of the document for display may be changed to satisfy a minimum requirement for the client devices of a presentation group which may change during or before the presentation session). In other scenarios the document session may deliver a document from the document application to the messaging application before the beginning of a presentation session for that document.

The messaging application may also send presentation session information to the document application. The presentation session information may be conveyed to the document application in one or more steps of (including acknowledgement and/or response from the document application) information exchanges. The presentation session information may include one or more of session information items such as presentation session ID, user ID (or Presenter ID), document ID, a pointer or identifier for a portion within the document, date, timestamp. User comments and a mapping of user comments to display portions of the document for a presentation session may be sent from the messaging application to the document application to be stored and maintained in a database associated with the document application.

Presenter may navigate (e.g. using the navigation commands for the presentation session on the user interface) to any portion or part within the document and may trigger the messaging application to send a request to the document application for the corresponding portion of the document. The document application would respond by sending the corresponding portion of the document to the messaging application.

In one scenario a document application (e.g. through its presentation support service) may provide the entire multimedia document and also include any associated meta data (e.g. document version, date, update status etc.) to the presentation service of a messaging application. The Presentation service then may not need to make additional requests for any portions of the multimedia document.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions detailed above. One general aspect includes a computer-implemented method for presenting a graphical presentation to an audience member on a mobile device, the graphical presentation including a sequence of images stored in a presenting computer remote from and connected to the mobile device via a network, the computer-implemented method including: receiving a first image of the sequence of images from the presenting computer over the network; displaying the first image over a first presentation area of a user interface on the mobile device; receiving, via a second presentation area of the user interface on the mobile device, a first comment from the audience member and displaying the first comment in the second presentation area in association with the first image; storing a first link between the first comment and the first image; receiving a second image of the sequence of images from the presenting computer over the network; displaying the second image over the first presentation area of the user interface on the mobile device; receiving, via the second presentation area of the user interface on the mobile device, a second comment from the audience member and displaying the second comment in the second presentation area in association with the second image; storing a second link between the second comment and the second image; receiving a command from the presenting computer to display a second instance of the first image; and responsive to the command and the first link. The computer-implemented method also includes displaying the second instance of the first image over the first presentation area of the user interface on the mobile device. The computer-implemented method also includes displaying the first comment in the second presentation area in association with the second instance of the first image. Other embodiments of this aspect include corresponding computer systems, apparatus, and computer programs recorded on one or more computer storage devices, each configured to perform the actions of the methods.

Implementations may include one or more of the following features. The computer-implemented method where the second presentation area of the user interface includes a touch screen display. The computer-implemented method further including receiving a third comment from the presenting computer over the network while displaying the first image over the first presentation area of the user interface and displaying the third comment in the second presentation area in association with the first image. The computer-implemented method further including storing a third link between the third comment and the first image. The computer-implemented method further including, responsive to the command and the third link, displaying the third comment in the second presentation area in association with the second instance of the first image. The computer-implemented method where displaying the second instance of the first image including receiving the second instance of the first image from the presenting computer over the network. The computer-implemented method further including storing the first image in a local memory of the mobile device, where displaying the second instance of the first image includes reading the stored first image from the local memory. The computer-implemented method further including receiving a second command from the audience member to display a second instance of the second image and, responsive to the second command and the second link. The computer-implemented method may also include displaying the second instance of the second image over the first presentation area of the user interface on the mobile device. The computer-implemented method may also include displaying the second comment in the second presentation area in association with the second instance of the second image. The computer-implemented method where the first image and the second image are received from the presenting computer as a document. The computer-implemented method where the document includes the graphical presentation.

The various features in embodiments described herein may be used alone or in combination with one or more other features. The features, embodiments, processes, methods, apparatus, systems and other elements of the present disclosure are implementable in software, hardware, firmware or in any possible combination of hardware, firmware, or software on a computer-accessible medium.

What is claimed is:

1. A method for facilitating, via a messaging application, an exchange of messages relating to a presentation of a document via a graphical user interface of a presentation device associated with a presenter, the method comprising:
   receiving the document as a plurality of display portions for presentation;
   receiving a presentation-initiation command and, responsive to the presentation-initiation command, initiating a presentation session;
   rendering, in the presentation session, a presentation view on the graphical user interface, the presentation view including a presentation window and a comments window;
   updating the presentation window to display a first display portion of the display portions;
   receiving a first comment message while displaying the first display portion;
   displaying the first comment message in the comments window and linking the first comment message to the first display portion;
   updating the presentation window to display a second display portion of the display portions;
   receiving a second comment message while displaying the second display portion;
   displaying the second comment message in the comments window and linking the second comment message to the second display portion;
   receiving, on the graphical user interface, a selection of the first comment message; and
   responsive to the selecting, displaying the first display portion adjacent to the first comment message.

2. The method of claim 1, wherein the presentation view includes a comment scroll bar for scrolling through a plurality of comment messages including the first comment message and the second comment message, and scrolling from the first comment message to the second comment message causes the display window to display the second display portion.

3. The method of claim 2, the presentation view including a third menu to accept a presentation command to advance to the second display portion of the document, the method further comprising issuing a notice to the messaging application, responsive to the presentation command, of the presenter advancing to the second display portion.

4. A method for audience participation, via a messaging application, in a presentation of a document via a graphical user interface of a receiving device associated with an audience member, the method comprising:
   receiving, via the messaging application, an invitation message supporting a link to a presentation;
   rendering a first view on the graphical user interface, the first view supported by the messaging application and depicting the invitation message and an area responsive to the link;
   rendering, responsive to a selection of the link, a second view on the graphical user interface, the second view including a presentation window and a comments window;
   receiving at least one of a first display portion and a second display portion of the document and displaying the first display portion in the presentation window;
   receiving a first comment message from the audience member via the graphical user interface;
   displaying the first comment in the comments window aligned to a first side of the graphical user interface that is associated with the audience member, wherein the first comment is segregated from comments from other participants that are aligned to a second side of the graphical user interface, and linking the first comment message to the first display portion of the presentation;
   sending a first association to the messaging application;
   receiving a second comment message to the second display portion of the presentation;
   selecting the second comment message in the comments window; and
   responsive to the selecting, displaying the second display portion in the presentation window.

5. The method of claim 4, wherein the graphical user interface includes a comment scroll bar for scrolling through a plurality of comment messages including the first comment message and the second comment message, and scrolling from the second comment message to the first comment message causes the presentation window to display the first display portion.

6. The method of claim 5, further comprising receiving a notice that the presentation of the document has advanced to a third display portion, and receiving the third display portion with the notice.

7. The method of claim 5, at least one of the first view and the second view including a menu to receive an instruction to disregard subsequent notices.

8. The method of claim 7, wherein the instruction instructs the receiving device to temporarily disregard the subsequent notices.

9. The method of claim 7, further comprising altering the second view to facilitate display portion selection by the audience member responsive to the instruction.

10. The method of claim 9, wherein the display-portion selection for the first display portion comprises selecting the first comment.

11. The method of claim 7, wherein selecting the first comment issues the instruction to disregard the subsequent notices.

12. The method of claim 11, the menu to receive a second instruction to react to the subsequent notices.

13. The method of claim 7, further comprising storing the subsequent notices and reacting to at least one of the stored subsequent notices responsive to a second instruction.

14. The method of claim 13, wherein reacting to the at least one of the stored subsequent notices synchronizes the presentation window with the presentation window of the presenter.

15. A method for facilitating a presentation in a messaging application, the method comprising:
    supporting, by a server, a first messaging view on a user interface;
    supporting, by the server, a presentation command for initiating a presentation session;
    receiving, by the server, the presentation command from the first user to initiate a presentation session;
    obtaining, by the server, document structure information for presenting a document, the document structure information including a plurality of display portions;
    supporting, by the server, a presentation view on the user interface based on the document structure information, the presentation view including a presentation window and a comments window;
    receiving, by the server, a first comment message and linking the first comment message with a first display portion of the plurality of display portions, such that the comments window includes the first comment message when the presentation window includes the first display portion;
    receiving, by the server, a second comment message and linking the second comment message with a second display portion of the plurality of display portions, such that the comments window includes the second comment message when the presentation window includes the second display portion;
    supporting, by the server, a first link in the comments window associated with the first comment message, such that selection of the first link causes the first display portion to be displayed in the presentation window; and
    supporting, by the server, a second link in the comments window associated with the second comment message, such that selection of the second link causes the second display portion to be displayed in the presentation window.

16. The method of claim 15, further comprising receiving, by the server via the user interface, a notice of advancing the presentation to the second display portion and, responsive to the notice, supporting display of the second display portion in the presentation window.

17. The method of claim 15, further comprising receiving, by the server, an activation of the first link and, responsive to the activation of the first link, supporting display of the first display portion in the presentation window.

* * * * *